(12) United States Patent
Manning (10) Patent No.: US 6,853,630 B1
(45) Date of Patent: Feb. 8, 2005

(54) METHOD AND APPARATUS FOR MERGING ACCOUNTING RECORDS TO MINIMIZE OVERHEAD

(75) Inventor: Serge M. Manning, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 603 days.

(21) Appl. No.: 09/595,937

(22) Filed: Jun. 16, 2000

(51) Int. Cl.[7] .................................................. H04Q 7/24
(52) U.S. Cl. ........................ 370/338; 455/405; 455/406
(58) Field of Search .............................. 705/30, 32, 34, 705/253; 370/351, 379, 338, 331, 352–356, 912, 913, 401; 455/405, 406

(56) References Cited

U.S. PATENT DOCUMENTS

| | | | | |
|---|---|---|---|---|
| 6,023,606 A | * | 2/2000 | Monte et al. | 455/13.1 |
| 6,405,251 B1 | * | 6/2002 | Bullard et al. | 709/224 |
| 6,512,754 B2 | * | 1/2003 | Feder et al. | 370/338 |

OTHER PUBLICATIONS

3G Packet Data Accounting Requirements; Lipford et al; Jul. 27, 1999; pp. 1–6.

* cited by examiner

Primary Examiner—Robert P. Olszewski
Assistant Examiner—El Gort

(57) ABSTRACT

A method and apparatus for merging accounting records to minimize overhead is provided. The method and apparatus accumulate accounting information for data transmissions between a wireless communication device and a host on a data network. The method and apparatus are capable of accumulating accounting information for short data bursts and for active traffic channel transmissions such that an accounting messages is sent to an accounting server only when transitions from short data burst transmission or active traffic channel transmission to another state are encountered. Thus, accounting information for a plurality of sequential short data bursts and/or active traffic channel transmissions are accumulated. This reduces the number of accounting messages sent to an accounting server and eliminates race conditions that may be encountered by sequential short data bursts.

20 Claims, 9 Drawing Sheets

FIG. 3

| ITEM | | PARAMETER | MAX PAYLOAD LENGTH | FORMAT |
|---|---|---|---|---|
| 310 | | AIRLINK RECORD TYPE = Y1 (CONNECTION SETUP) | 1 | INTEGER |
| 320 | | R-P SESSION ID | 4 | STRING |
| 330 | A1 | MSID | 15 | STRING |
| 340 | D3 | SERVING PCF | 4 | IP-ADDR |
| 350 | D4 | BS/MSC ID | 6 | INTEGER |

FIG. 4

| ITEM | | PARAMETER | MAX PAYLOAD LENGTH | FORMAT |
|---|---|---|---|---|
| 410 | Y | AIRLINK RECORD TYPE = Y2 (CONNECTION RELEASE) | 1 | INTEGER |
| 420 | C1 | R-P SESSION ID | 4 | STRING |

FIG. 5

| ITEM | | PARAMETER | MAX PAYLOAD LENGTH | FORMAT |
|---|---|---|---|---|
| 505 | | AIRLINK RECORD TYPE = Y3 (ACTIVE START) | 1 | INTEGER |
| 510 | | R-P SESSION ID | 4 | STRING |
| 515 | E1 | USER ZONE | 2 | INTEGER |
| 520 | F1 | FORWARD MUX OPTION | 2 | INTEGER |
| 525 | F2 | REVERSE MUX OPTION | 2 | INTEGER |
| 530 | F3 | FORWARD FUNDAMENTAL RATE | 1 | INTEGER |
| 535 | F4 | REVERSE FUNDAMENTAL RATE | 1 | INTEGER |
| 540 | F5 | SERVICE OPTION | 2 | INTEGER |
| 545 | F6 | FORWARD TRAFFIC TYPE (PRIMARY, SECONDARY) | 1 | INTEGER |
| 550 | F7 | REVERSE TRAFFIC TYPE (PRIMARY, SECONDARY) | 1 | INTEGER |
| 555 | F8 | FUNDAMENTAL FRAME SIZE (5/20 ms) | 1 | INTEGER |
| 560 | F9 | FORWARD FUNDAMENTAL RC | 1 | INTEGER |
| 565 | F10 | REVERSE FUNDAMENTAL RC | 1 | INTEGER |
| 570 | I4 | AIRLINK QUALITY OF SERVICE (QOS) | 4 | INTEGER |

FIG. 6

| ITEM | PARAMETER | MAX PAYLOAD LENGTH | FORMAT |
|---|---|---|---|
| 610 | AIRLINK RECORD TYPE = Y4 (ACTIVE STOP) | 1 | INTEGER |
| 620 | R-P SESSION ID | 4 | STRING |
| 630  G8 | ACTIVE CONNECTION TIME IN SECONDS | 4 | INTEGER |

FIG. 7

| ITEM | PARAMETER | MAX PAYLOAD LENGTH | FORMAT |
|---|---|---|---|
| 710 | AIRLINK RECORD TYPE = SDB | 1 | INTEGER |
| 720 | R-P SESSION ID | 4 | STRING |
| 730  F4 | MOBILE ORIGINATED/MOBILE TERMINATED INDICATOR | 1 | INTEGER |
| 740  G10 | SDB OCTET COUNT | 4 | INTEGER |

FIG. 9

| TIME | WIRELESS COMMUNICATION NETWORK | ACCOUNTING CONTROLLER |
|---|---|---|
| 1 | MS IS DORMANT | |
| 2 | | NETWORK ORIGINATED DATA ENTERS DN AND SENT TO WCN<br>• octet_count INCREMENTED |
| 3 | SDB IS BEING TRANSMITTED OVER THE AIR | MORE NETWORK DATA ENTERS DN AND SENT TO WCN<br>• octet_count INCREMENTED |
| 4 | • AIRLINK RECORD (SDB, sdb_octets1) SENT | • START AND STOP RECORDS SENT TO ACCOUNTING SERVER USING sdb_octets1<br>• octet_count DECREMENTED BY sdb_octets1 |
| 5 | RN DECIDES TO PUT MS ON TRAFFIC CHANNEL<br>• ACTIVE START AIRLINK RECORD SENT | • START RECORD SENT TO ACCOUNTING SERVER |
| ⋮ | ⋮ | ⋮ |
| 0 | MS GOES DORMANT<br>• ACTIVE STOP AIRLINK RECORD SENT | • STOP RECORD SENT TO ACCOUNTING SERVER WITH octet_count<br>• octet_count ZEROED |

FIG. 8A

| ITEM | PARAMETER | DESCRIPTION |
|---|---|---|
| A. MOBILE IDENTIFIERS | | |
| A1 | MSID | |
| B. USER IDENTIFIERS | | |
| B1 | IP ADDRESS | IP ADDRESS OF THE MOBILE STATION |
| B2 | NETWORK ACCESS IDENTIFIER (NAI) | USER@DOMAIN CONSTRUCT WHICH IDENTIFIES THE USER AND HOME NETWORK OF THE MOBILE STATION |
| C. SESSION IDENTIFIERS | | |
| C1 | ACCOUNT SESSION ID | A UNIQUE ACCOUNTING ID. ID CREATED BY THE PDSN THAT ALLOWS STOP AND START RECORDS TO BE MATCHED IN A LOG FILE |
| C2 | CORRELATION ID | AN ID THAT CORRELATES ALL ACCOUNTING SESSIONS AUTHORIZED FOR THIS NAI BY THIS ACCESS REQUEST |
| D. INFRASTRUCTURE IDENTIFIERS | | |
| D1 | MIP HOME AGENT (HA) | THE IP ADDRESS OF THE HA |
| D2 | PDSN/FA ADDRESS | IP ADDRESS OR OTHER IDENTIFIER |
| D3 | SERVING PCF | THE IP ADDRESS OF THE SERVING PCF |
| D4 | BS/MSC ID | THE IP ADDRESS OF THE BS/MSC |
| E. ZONE IDENTIFIERS | | |
| E1 | USER ZONE | TIERED SERVICES USER ZONE |
| F. SESSION STATUS | | |
| F1 | FORWARD MUX OPTION | |
| F2 | REVERSE MUX OPTION | |
| F3 | FORWARD FUNDAMENTAL RATE | |
| F4 | REVERSE FUNDAMENTAL RATE | |
| F5 | SERVICE OPTION | |
| F6 | FORWARD TRAFFIC TYPE | PRIMARY AND SECONDARY |
| F7 | REVERSE TRAFFIC TYPE (PRIMARY, SECONDARY) | PRIMARY AND SECONDARY |
| F8 | FUNDAMENTAL FRAME SIZE | THE FUNDAMENTAL CHANNEL HAS THE CHOICE OF 5 OR 20 ms SIZE. THE 5ms FRAME SIZE COMES FROM THE DCCH (DEDICATED SIGNALING CHANNEL) CONCEPT AND ALLOWS FAST RESPONSE FOR SHORT SIGNALING MESSAGES (SHORT FRAME CAN BE DECODED QUICKLY) |
| F9 | FORWARD FUNDAMENTAL RC | |
| F10 | REVERSE FUNDAMENTAL RC | |
| F11 | IP TECHNOLOGY | IDENTIFIES SIMPLE IP, MOBILE IP, OR ANOTHER TECHNOLOGY |

FROM FIG. 8A

| ITEM | PARAMETER | DESCRIPTION |
|---|---|---|
| F12 | COMPULSORY TUNNEL INDICATOR | INDICATOR OF INVOCATION OF COMPULSORY TUNNEL ESTABLISHED ON BEHALF OF MS FOR PROVIDING PRIVATE NETWORK AND/OR ISP ACCESS DURING A SINGLE PACKET DATA CONNECTION |
| F13 | RELEASE INDICATOR | SPECIFIES REASON FOR SENDING A STOP RECORD |
| G. SESSION ACTIVITY | | |
| G1 | DATA OCTET COUNT (TERMINATING) | TOTAL NUMBER OF OCTETS SENT TO THE USER |
| G2 | DATA OCTET COUNT (ORIGINATING) | TOTAL NUMBER OF OCTETS SENT BY THE USER |
| G3 | BAD PPP FRAME COUNT | TOTAL NUMBER PPP FRAMES FROM THE MOBILE STATION DROPPED BY PDSN DUE TO UNCORRECTABLE ERRORS |
| G4 | EVENT TIME | INDICATES START OF ACCOUNTING SESSION OR STOP OF ACCOUNTING SESSION IF PART OF A RADIUS START MESSAGE OR STOP MESSAGE, RESPECTIVELY. IT IS ALSO USED IN A RADIUS INTERIM MESSAGE TO INDICATE THE TIME OF THE EVENT WHICH TRIGGERED THE INTERIM MESSAGE |
| G8 | ACTIVE TIME | THE TOTAL ACTIVE CONNECTION TIME ON TRAFFIC CHANNEL IN SECONDS |
| G9 | NUMBER OF ACTIVE TRANSITIONS | THE TOTAL NUMBER OF NON-ACTIVE TO ACTIVE TRANSITIONS BY THE USER |
| G10 | SDB OCTET COUNT (TERMINATING) | THE TOTAL NUMBER OF OCTETS SENT TO THE USER VIA SHORT DATA BURSTS |
| G11 | SDB OCTET COUNT (ORIGINATING) | THE TOTAL NUMBER OF OCTETS SENT BY THE USER VIA SHORT DATA BURSTS |
| G12 | NUMBER OF SDBs (TERMINATING) | THE TOTAL NUMBER OF SHORT DATA BURST TRANSACTIONS |
| G13 | NUMBER OF SDBs (ORIGINATING) | THE TOTAL NUMBER OF SHORT DATA BURST TRANSACTIONS |
| H. SPECIAL BILLING INSTRUCTIONS | | |
| H1 | ALTERNATE BILLING IDENTIFIER | AN IP ADDRESS OR OTHER IDENTIFIER OF ALTERNATE ENTITY FOR WHICH DATA SESSION USAGE MAY BE BILLED |
| I. QUALITY OF SERVICE | | |
| I1 | IP QUALITY OF SERVICE (QOS) | THE HOME RADIUS SERVER AUTHORIZES THE MOBILE TO MARK PACKETS (ONLY) WITH THESE DIFFERENTIATED -SERVICES-CODE-POINTS |
| I2 | INTERCONNECTION IP NETWORK PROVIDER ID | IDENTIFIES IP NETWORK WHICH CONNECTS WIRELESS CARRIER NETWORK TO DESTINATION |
| I3 | INTERCONNECTING IP NETWORK SERVICE QUALITY OF SERVICE | IDENTIFIES QOS OFFERED BY IP NETWORK WHICH CONNECTS WIRELESS CARRIER NETWORK TO DESTINATION |
| I4 | AIRLINK QUALITY OF SERVICE (QOS) | IDENTIFIES AIRLINK QOS |

FIG. 10

| TIME | WIRELESS COMMUNICATION NETWORK | ACCOUNTING CONTROLLER |
|---|---|---|
| 1 | MS IS DORMANT ||
| 2 | | NETWORK ORIGINATED DATA ENTERS DN AND SENT TO WCN<br>° octet_count INCREMENTED |
| 3 | SDB1 IS BEING TRANSMITTED OVER THE AIR | MORE NETWORK DATA ENTERS DN AND SENT TO WCN<br>° octet_count INCREMENTED |
| 4 | SDB2 IS BEING TRANSMITTED OVER THE AIR<br>° AIRLINK RECORD (SDB1, sdb_octets1) SENT | MORE NETWORK DATA ENTERS DN AND SENT TO WCN<br>° INCREMENTS num_SDBs BY 1, AND total_SDB_octets BY sdb_octets1<br>° octet_count INCREMENTED |
| 5 | SDB3 IS BEING TRANSMITTED OVER THE AIR<br>° AIRLINK RECORD (SDB2, sdb_octets2) SENT | MORE NETWORK DATA ENTERS DN AND SENT TO WCN<br>° PDSN INCREMENTS num_SDBs BY 1, AND total_SDB_octets BY sdb_octets2<br>° octet_count INCREMENTED |
| 6 | | INTERIM TIMER EXPIRES<br>° START AND STOP RECORDS SENT TO ACCOUNTING SERVER USING num_SDBs, total_SDB_octets and octet_count<br>° CLEAR num_SDBs, total_SDB_octets AND octet_count |
| 7 | ° AIRLINK RECORD (SDB3, sdb_octets3) SENT | MORE NETWORK DATA ENTERS DN AND SENT TO WCN<br>° INCREMENTS num_SDBs BY 1, AND total_SDB_octets BY sdb_octets3<br>° octet_count INCREMENTED |
| 8 | WCN DECIDES TO PUT MS ON TRAFFIC CHANNEL<br>° ACTIVE START AIRLINK RECORD SENT | MORE NETWORK DATA ENTERS DN AND SENT TO WCN<br>° START RECORD SENT TO ACCOUNTING SERVER WITH num_SDBs, total_SDB_octets AND octet_count<br>° octet_count INCREMENTED |
| ° ° ° | ° ° ° | ° ° ° |
| n | MS GOES DORMANT<br>° ACTIVE STOP AIRLINK RECORD SENT | ° STOP RECORD SENT TO ACCOUNTING SERVER WITH num_SDBs, total_SDB_octets AND octet_count<br>° CLEAR num_SDBs, total_SDB_octets AND octet_count |

FIG. 11

| TIME | WIRELESS COMMUNICATION NETWORK | ACCOUNTING CONTROLLER |
|---|---|---|
| 1 | | MS IS DORMANT |
| 2 | | NETWORK ORIGINATED DATA ENTERS DN AND SENT TO WCN<br>∘ octet_count INCREMENTED |
| 3 | WCN DECIDES TO PUT MS ON TRAFFIC CHANNEL<br>∘ ACTIVE START AIRLINK RECORD SENT | NETWORK ORIGINATED DATA ENTERS DN AND SENT TO WCN<br>∘ START RECORD SENT TO ACCOUNTING SERVER<br>∘ octet_count INCREMENTED |
| 4 | MS GOES DORMANT<br>∘ ACTIVE STOP AIRLINK RECORD SENT | ∘ STOP RECORD SENT TO ACCOUNTING SERVER USING octet_count<br>∘ octet_count ZEROED |
| 5 | | NETWORK ORIGINATED DATA ENTERS DN AND SENT TO WCN<br>∘ octet_count INCREMENTED |
| 6 | WCN DECIDES TO PUT MS ON TRAFFIC CHANNEL<br>∘ ACTIVE START AIRLINK RECORD SENT | ∘ START RECORD SENT TO ACCOUNTING SERVER |
| 7 | MS GOES DORMANT<br>∘ ACTIVE STOP AIRLINK RECORD SENT | ∘ STOP RECORD SENT TO ACCOUNTING SERVER WITH octet_count<br>∘ octet_count ZEROED |

FIG. 12

| TIME | WIRELESS COMMUNICATION NETWORK | ACCOUNTING CONTROLLER |
|---|---|---|
| 1 | WCN DECIDES TO PUT MS ON TRAFFIC CHANNEL AND NEW PPP IS ESTABLISHED<br>• ACTIVE START AIRLINK RECORD (NEW PPP) SENT | • START RECORD SENT TO ACCOUNTING SERVER |
| 2 | MS GOES DORMANT<br>• ACTIVE STOP AIRLINK RECORD (active_time1) SENT | • INCREMENT total_active_time BY active_time1 |
| 3 | | NETWORK ORIGINATED DATA ENTERS DN AND SENT TO WCN<br>• octet_count INCREMENTED |
| 4 | WCN DECIDES TO PUT MS ON TRAFFIC CHANNEL<br>• ACTIVE START AIRLINK RECORD SENT | NETWORK ORIGINATED DATA ENTERS DN AND SENT TO WCN<br>• octet_count INCREMENTED |
| 5 | MS GOES DORMANT<br>• ACTIVE STOP AIRLINK RECORD (active_time2) SENT | • INCREMENT total_active_time BY active_time2 |
| 6 | | INTERIM TIMER EXPIRES<br>• INTERIM RECORD SENT TO ACCOUNTING SERVER WITH octet_count AND total_active_time<br>• octet_count AND total_active_time ZEROED |
| ⋮ | ⋮ | ⋮ |
| n | | PPP SESSION IS CLOSED (TIMEOUT)<br>• STOP RECORD SENT TO ACCOUNTING SERVER WITH octet_count AND total_active_time |

Figure 13

METHOD AND APPARATUS FOR MERGING ACCOUNTING RECORDS TO MINIMIZE OVERHEAD

1. Field of the Invention

The present invention relates generally to a method and apparatus for merging accounting records to minimize overhead. In particular, the present invention is directed to a method and apparatus for merging accounting records for traffic flowing between a wireless communication network and a packet switched data network.

2. Background of the Invention

As wireless communication becomes more highly used in our society, people look for more features in their wireless communication service providers and equipment. Once feature that is slowly becoming more prevalent is the ability to transmit and receive data over wireless communication links. With this feature, persons using wireless digital equipment may send and receive electronic mail, "surf" the Internet, and even download computer applications. Virtually, any function that may be performed with a computer using a land-line wired connection to the Internet, may one day be performed over wireless communication links.

As a result, there is a need to be able to perform accounting of usage of wireless communication links to obtain access to data networks, such as the Internet. However, such accounting is typically performed by the separate networks, i.e. there are accounting records for the wireless communication network and other accounting records for the data network. These two sets of accounting records may be difficult to correlate. Thus, it would be beneficial to have an apparatus and method for merging accounting records for traffic flowing between wireless communication networks and data packet switched networks.

SUMMARY OF THE INVENTION

The present invention provides a method and apparatus for merging accounting records to minimize overhead. The method and apparatus accumulate accounting information for data transmissions between a wireless communication device and a host on a data network. The method and apparatus are capable of accumulating accounting information for short data bursts and for active traffic channel transmissions such that an accounting messages is sent to an accounting server only when transitions from short data burst transmission or active traffic channel transmission to another state are encountered. Thus, accounting information for a plurality of sequential short data bursts and/or active traffic channel transmissions are accumulated. This reduces the number of accounting messages sent to an accounting server and eliminates race conditions that may be encountered by sequential short data bursts.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 5A and 8B are an exemplary table diagram of the parameters that make up a usage data record in accordance with the present invention;

FIG. 10 is an exemplary timing diagram illustrating the messages sent when SDB accounting information is accumulated for a plurality of SDBs;

DETAILED DESCRIPTION OF THE PREFERRED EMBODIMENTS

Figure 1:
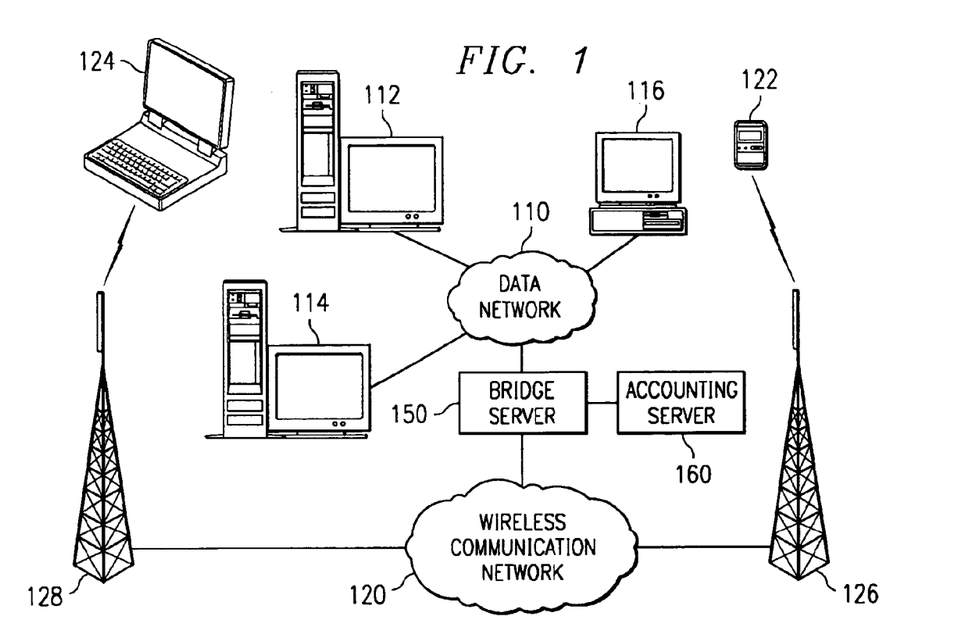
FIG. 1 is an exemplary block diagram of a distributed data processing system in which the present invention may be implemented.

FIG. 1 is an exemplary diagram of a distributed data processing system in which the present invention may be implemented. As shown in FIG. 1, the distributed data processing system 100 includes a data network 110, a wireless communication network 120, a bridge server 150 and an accounting server 160.

The data network 110 provides communication pathways for a plurality of computing devices, such as server devices 112 and 114 and client device 116. The data network 110 may be any type of packet data network, such as a local area network (LAN), wide area network (WAN), an intranet, the Internet, and the like. In a preferred embodiment of the present invention, the data network 110 is considered to be the Internet.

The Internet is a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems, that route data and messages.

The wireless communication network 120 provides communication pathways for a plurality of wireless communication devices, such as personal digital assistant (PDA) 122, laptop computer 124, cellular telephones, and the like. The wireless communication network 120 may be any type of wireless communication network, such as a cellular network, satellite network, radio network, and the like. In a preferred embodiment of the present invention, the wireless communication network 120 is a wireless packet data network, such as a digital cellular communication network.

The cellular communication network 120 is a network of base stations 126 and 128 which are used to communicate with wireless communication devices 122 and 124 using radio communications. The wireless communication devices 122 and 124 support TCP/IP, allowing the wireless communication devices 122 and 124 to have access to the Internet 110. For example, the wireless communication devices 122 and 124 may communicate using the PCS band, which is a radio spectrum that was auctioned off by the U.S. Government in the mid 1990s.

The networks 110 and 120 are linked with one another via the bridge server 150. The bridge server 150 accepts digital communication signals from either the data network 110 or the wireless communication network 120, formats the signal for the other network, and forwards the digital communication signal to the other network. By linking the two networks 110 and 120 via the bridge server 150, a user of a wireless communication device, such as laptop computer 124, may send and retrieve information to and from computing devices linked to the data network 110. For example, a user of the laptop computer 124 may receive Web pages from the data network 110 and send electronic mail messages to computing devices linked to the data network 110.

While FIG. 1 shows the bridge server 150 being disposed between the wireless communication network 120 and the data network 110, the invention is not limited to such. Rather, the bridge server 150 may be a packet data serving node (PDSN) in either the wireless communication network 120 or the data network 110. Furthermore, the processes of the present invention may be distributed amongst a plurality of bridge servers 150.

In addition, the bridge server 150 collects accounting information for billing and statistical purposes. The accounting information includes sufficient information for determining the services provided to the user, the amount of time on the networks 110 and 120, the number of data packets transmitted, and/or the like. The accounting information is obtained from the wireless communication network 120 and the data network 110. The accounting information obtained from the wireless communication network 120 includes wireless specific parameters and the accounting information from the data network 110 includes data network specific parameters. The accounting information obtained from the wireless communication network 120 is obtained from the base station controllers of the wireless communication network 120. The bridge server 150 itself maintains the accounting information for the data network 110. This accounting information is forwarded to an accounting server 160 for proper accounting procedures.

The accounting server 160 may be, for example, a Remote Authentication Dial-In User Service (RADIUS) server or the like. RADIUS is an access control protocol developed by Livingston Enterprises that uses a client-server based protocol for collecting accounting information. RADIUS is designed to work with dialup wire-line communications. In this case, a call session is initiated (RADIUS start) and the call is established for a certain duration. When the call is terminated, the call session is terminated (RADIUS stop).

In a wireless communication environment, a mobile communication device starts a session and then has traffic channels established intermittently. Finally at some point, the mobile communication device either ends the session gracefully by sending a session termination command or just disappears and the wireless communication system performs "clean-up" procedures after a predetermined amount of no activity. Thus, if RADIUS were applied to conventional wireless communication environments, the result would require many RADIUS start and stop messages for every traffic channel setup and teardown even though the session itself has not been terminated. The present invention provides a mechanism by which excessive start and stop messages are avoided during a communication session.

In a preferred embodiment, the bridge server 150 collects accounting information from the data network 110 and the wireless communication network 120 and merges the accounting information into data structures, called usage data records (hereafter referred to as UDRs), that are formatted to the RADIUS protocol. The UDRs are sent to the accounting server 160 which then provides positive acknowledgment that the UDRs were received correctly. The bridge server 150 will formulate one UDR per session per wireless communication device. If there are multiple IP addresses for the same session, however, the bridge server 150 will formulate multiple UDRs.

The accounting server 160 maintains the UDR until the UDR is removed by an operator billing system. The process by which an operator billing system removes UDRs from an accounting server 160 is generally known in the art and will therefore, not be described in further detail.

The bridge server 150 obtains the wireless network specific parameters from messages sent to the bridge server 150 from the wireless communication network 120. These messages are sent from Packet Control Functions (PCFs) (described in Technical Service Bulletin (TSB)-115, available from the Telecommunications Industry Association), or more generally, base station controllers (BSCs), in the wireless communication network associated with the base stations 126 and 128. Once the bridge server 150 merges the accounting information from the wireless communication network 120 with the accounting information from the data network 110, the resulting UDR information is sent to the accounting server 160 as an accounting request message, such as a RADIUS accounting-request message.

While the embodiment shown in FIG. 1 depicts a single data network 110 and a single wireless communication network 120, the invention is not limited to such. Rather, the data network 110 and the wireless communication network 120 may be comprised of one or more networks of the same or different types. In addition, while FIG. 1 shows the accounting server 160 being linked directly to the bridge server 150, the invention is not limited to such. Rather, the accounting server may be incorporated into the bridge server 150, linked to the bridge server 150 via the data network 110 or wireless communication network 120, or the like. Furthermore, the functions of the bridge server 150 and the accounting server 160 may be distributed across a plurality of bridge servers 150 and accounting servers 160 linked to the data network 110 and the wireless communication network 120.

Figure 2:
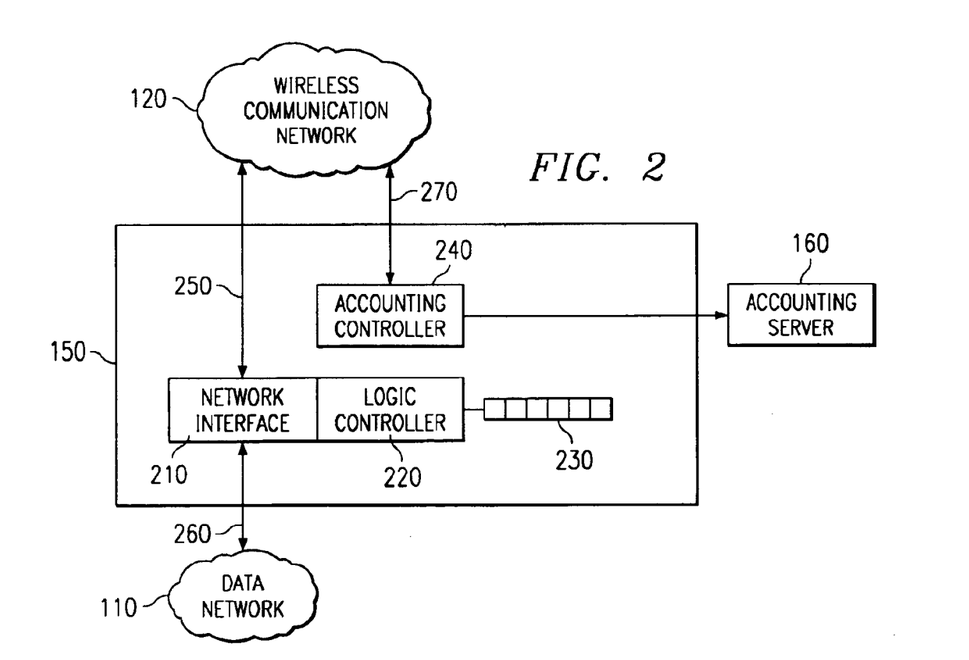
FIG. 2 is an exemplary block diagram illustrating the components of the bridge server in accordance with the present invention.

FIG. 2 is an exemplary diagram of the bridge server 150 according to the present invention. As shown in FIG. 2, the bridge server 150 includes a network interface 210, a logic controller 220, octet buffer 230, and accounting controller 240. Data is passed between the wireless communication network 120 and the data network 110 via the network interface 210 and communication links 250 and 260. Data received is stored in the octet buffer 230 until transmitted to the receiving network 110 or 120. An octet is an eight-bit storage unit. In the international community, octet is often used instead of byte.

Typically, wireless communication networks use octets for the transmission of data. Packet switched networks, such as the Internet, use data packets for transmission which may be comprised of multiple octets. Thus, when data packets are received from the data network 110, which in the preferred embodiment is the Internet, the data packets must first be broken down into octets. The breakdown of the data packets into octets is performed by the network interface 210 and logic controller 220 which then stores the octets in the octet buffer 230. The octets stored in the octet buffer 230 may then be transmitted to the wireless communication network 120 via the communication link 250.

Similarly, when data is received from the wireless communication network 120, the data is in the form of octets. The octets are stored in the octet buffer 230 until there is sufficient number of octets to form a data packet, as determined by the logic controller 220. Once there are sufficient octets in the octet buffer 230, a data packet is transmitted to the data network 110 via the communication link 260.

In addition to the data transmitted via the communication links 250 and 260, accounting messages are sent to the accounting controller 240 from the wireless communication network via the control channel 270. The accounting messages sent from the wireless communication network 120 to the accounting controller 240 are called airlink messages.

The data network accounting information is collected by the bridge server 150 itself. The bridge server 150 monitors octets flowing from the octet buffer and collects all other parameters not in airlink records from the network interface 210. The airlink messages are comprised of one or more airlink records.

The wireless communication system 120 generates one of five types of airlink records:

1) a connection setup record when the wireless communication network establishes a communication connection to the data network;
2) a connection release record when the wireless communication network release the communication connection with the data network;
3) an active start record when the wireless communication device starts to use traffic channel(s);
4) an active stop record when the wireless communication device stops using traffic channel(s); and
5) a short data burst (SDB) record when a short data burst is exchanged with the wireless communication device.

The receipt of a session setup airlink record instructs the accounting controller 240 to establish a usage data record (UDR) for a session. The UDR is established based on a session identifier, wireless communication device identifier, and the like. Thereafter, the airlink messages received by the accounting controller 240 are added to the UDR based on the session identifier that identifies the particular session with which the airlink message is associated. After a session release airlink record is received, the UDR is transmitted to an account server, such as account server 170. If the account server 170 returns an acknowledgment message, the UDR is removed from the accounting controller 240, otherwise the UDR is retransmitted until an acknowledgment message is received.

The following table diagrams will illustrate parameters for each of the various airlink messages that are transmitted by the wireless communication network 120 to the accounting controller 240 along with the resulting UDR that is sent to the accounting server. In each table, where appropriate, an item identifier is provided. The item identifiers in lower case correspond to the upper case item identifiers in the resulting UDR. Also in each table, a maximum payload length and format are provided. The maximum payload represents the maximum length of the field in the airlink message. The format represents the format of the parameter, e.g., integer, string, IP address, and the like.

Figure 3:
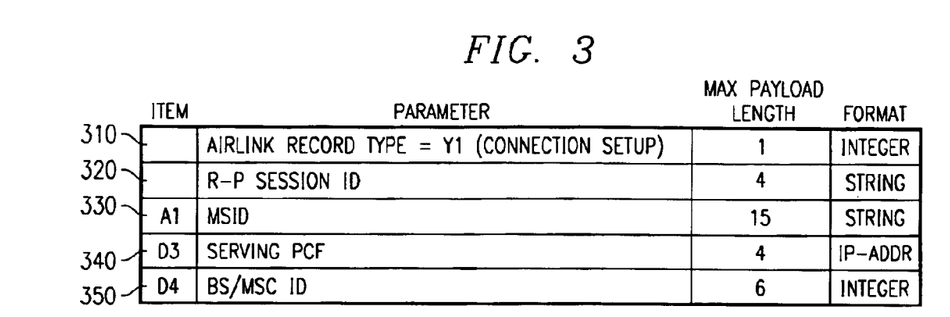
FIG. 3 is an exemplary table diagram of the parameters of a setup airlink 4 record in accordance with the present invention.

FIG. 3 is an exemplary table diagram of the parameters that make up a session setup airlink record. As shown in FIG. 3, the parameters include an airlink record type 310, a session identifier 320, a wireless communication device (referred to in FIG. 3 as a mobile station (MS)) identifier 330, a serving Packet Control Function (PCF) identifier 340, and a base station (BS) and/or mobile service center (MSC) identifier 350. The airlink record type 310 identifies the type of airlink message as being a session setup airlink record. The session identifier 320 is a unique identifier assigned to the session. The wireless communication device identifier 330 is a unique identifier assigned to the particular wireless communication device. The serving PCF identifier 340 is a unique identifier assigned to the PCF and the base station/mobile service center identifier 350 is a unique identifier assigned to the base station/mobile service center handling the communication in the wireless communication network 120.

This information is used by the accounting controller 240 to establish a UDR for the particular session. Once the session setup airlink record is received by the accounting controller 240, a UDR for the session is created and information for the session is maintained in the UDR until a session release airlink record is received.

Figure 4:
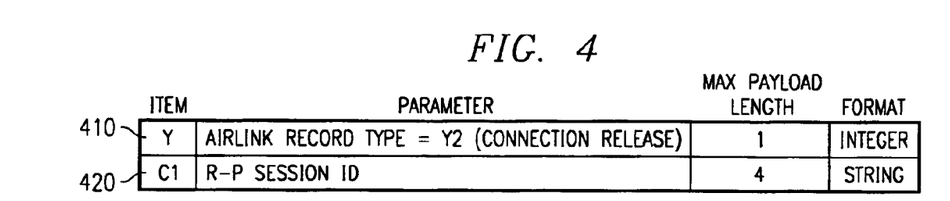
FIG. 4 is an exemplary table diagram of the parameters of a connection release airlink record in accordance with the present invention.

FIG. 4 is an exemplary table diagram of the parameters that make up a session release airlink record. The session release airlink record only contains an airlink record type 410 and a session identifier 420. The airlink record type 410 designates the airlink record as a connection release airlink record. The session identifier 420 identifies the session that has been ended. Once the session release airlink record is received, the accounting controller 240 sends the UDR to the accounting server.

Between the sending of the session setup airlink record and the session release airlink record, other interim airlink records are sent to the accounting controller 240 to designate different types of data communication that are occurring on the traffic channels. Once such airlink record is the active start airlink record. The active start airlink record designates to the accounting controller 240 that data transmission across the traffic channel has begun.

Figure 5:
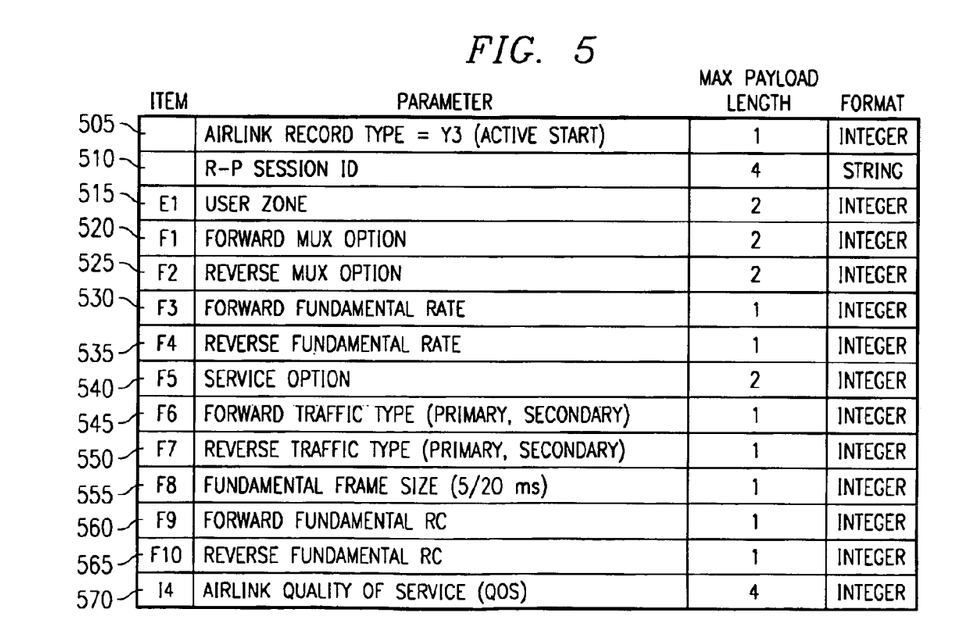
FIG. 5 is an exemplary table diagram of the parameters of an active start airlink record in accordance with the present invention.

FIG. 5 is an exemplary table diagram of the parameters that make up an active start airlink record. As shown in FIG. 5, the active start airlink record includes an airlink record type 505, a session identifier 510, a user zone 515, a forward Mux option 520, a reverse Mux option 525, a forward fundamental rate 530, a reverse fundamental rate 535, and a service option 540, a forward traffic type 545, a reverse traffic type 550, a fundamental frame size 555, a forward fundamental RC 560, a reverse fundamental RC 565 and an airlink quality of service 570. The airlink record type 505 identifies which type of airlink record it is (start, stop, SDB, connection setup, connection release). The session identifier 510 is a unique identifier for each wireless network-data network connection. The other parameters 515–565 are all defined parameters in standard TIA/EIA-2000 available from the Telecommunication Industry Association/Electronics Industry Association. The airlink quality of service 570 has 16 levels of priority values designated various levels of quality of service. These 16 levels of priority can also be found in standard TIA/EIA-2000. The active start airlink record informs the accounting controller 240 of the start of data transmission across the traffic channel.

Figure 6:
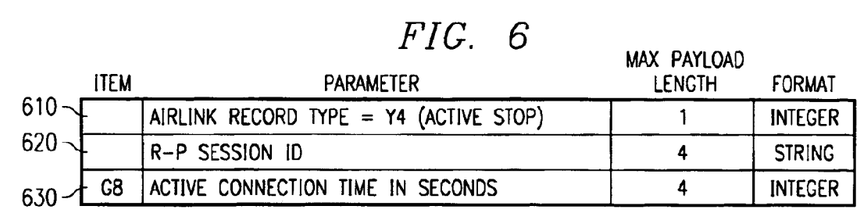
FIG. 6 is an exemplary table diagram of the parameters of a active stop airlink record in accordance with the present invention.

FIG. 6 is an exemplary table diagram illustrating the parameters of an active stop airlink record. As shown in FIG. 6, the active stop airlink record includes an airlink record type 610, a session identifier 620 and an active connection time in seconds 630. The airlink record type 610 identifies the airlink record as an active stop airlink record. The session identifier 620 identifies the session. The active connection time in seconds 630 informs the accounting controller 240 of the number of seconds the traffic channel was active with data from the session.

In addition to transmitting data over the traffic channels in a normal operation as handled by the above start and stop airlink records, data may be transmitted as short data bursts (SDBs). A short data burst is a burst of data that lasts for a very short time rather than a consistent stream of data and is sent over common traffic channels instead of dedicated traffic channels as specified in TIA/EIA-2000.

Figure 7:
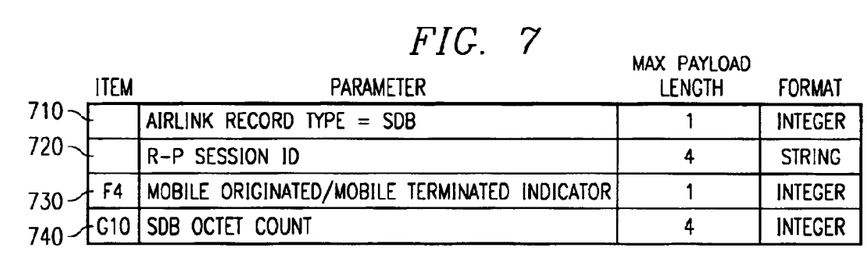
FIG. 7 is an exemplary table diagram of the parameters of a SDB airlink record in accordance with the present invention.

FIG. 7 is an exemplary table diagram illustrating the parameters of a short data burst (SDB) airlink record. As shown in FIG. 7, the SDB airlink record includes an airlink record type 710, a session identifier 720, a mobile originated/mobile terminated indicator 730, and an SDB octet count 740. The airlink record type 710 identifies the airlink record as a SDB airlink record. The session identifier 720 identifies the session. The airlink record type 710 identifies the airlink record as a SDB airlink record. The session identifier 720 identifies the session to which the SDB airlink record belongs. The mobile originated/mobile terminated indicator 730 indicates whether or not the SDB was received or sent from the wireless communication device, i.e. the mobile station and is used to increment forward direction or reverse direction SDB octet counts. The SDB octet count 740 identifies the number of octets of data sent during the short data burst.

Figure 8A:
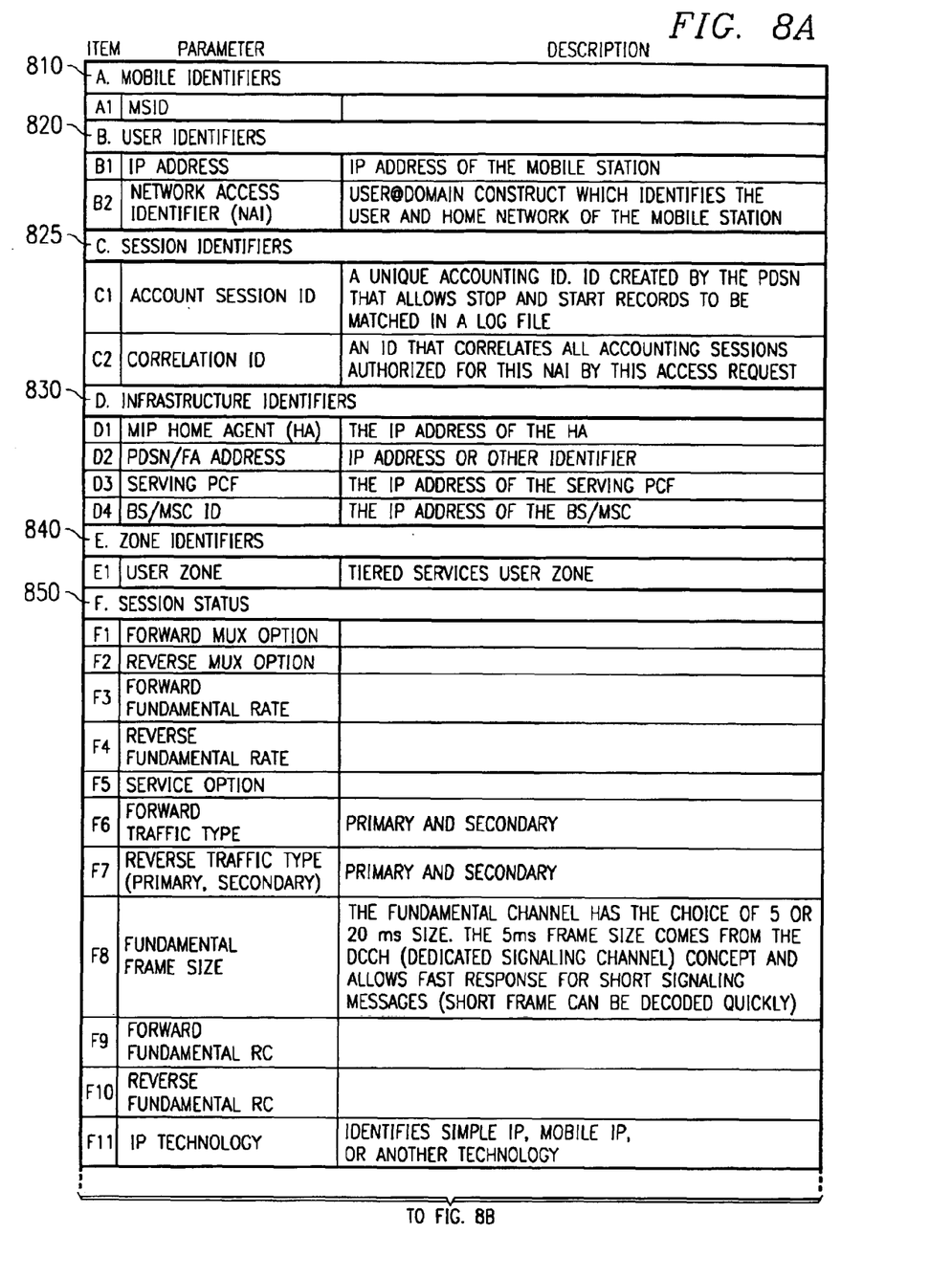

FIGS. 8A and 8B are an exemplary table diagram illustrating the parameters of a usage data record (UDR) according to the present invention. The various parameters of the UDR are populated by the information provided in the various airlink records described above.

As shown in FIG. 8, the UDR 800 includes a mobile station identifier (MSID) 810 which identifies the particular wireless communication device or mobile station. In addition to the MSID 810, the UDR 800 further includes user identifiers 820, session identifiers 825, infrastructure identifiers 830, zone identifiers 840, session status identifiers 850, session activity identifiers 860, special billing instructions identifiers 870 and quality of service identifiers 880.

The user identifiers 820 include an Internet Protocol (IP) address and network access identifier (NAI). The IP address is the IP address assigned to the mobile station upon initiation of an IP connection with the data network. The NAI is of the type "user@domain" thereby identifying the user and home network of the mobile station.

The session identifiers 825 include an account session identifier and a correlation identifier. The account session identifier is a unique identifier created by the accounting controller to allow start and stop records to be matched in a log file. The correlation identifier is an identifier that correlates the accounting sessions authorized for the NAI. Thus the correlation identifier allows multiple accounting sessions for a single NAI.

The infrastructure identifiers 830 includes a mobile IP (MIP) home agent (HA) identifier, a foreign agent (FA) identifier, a serving PCF identifier, and a BS/MSC identifier. The MIP home agent identifier is the IP address of the home agent. The home agent and foreign agent are defined by the Internet Engineering Task Force (IETF) in document RFC 2002. The FA identifier is the IP address of the foreign agent handling the communication. The serving PCF identifier is the IP address of the serving PCF. The base station (BS)/mobile station controller (MSC) identifier is the System ID/Network ID (SID/NID) as defined in TIA/EIA-2000 concatenated with a two octet BSC ID of the base station/mobile station controller handling the communication.

The zone identifier identifies the tiered services user zone of the mobile station. User zones are arbitrary geographic regions defined by the service provider. Charge rates may differ in different user zones. Thus, there may be tiered service user zones requiring different charge rates during a communication.

The session status indicators 840 contains a number of parameters including forward Mux option, reverse Mux option, forward fundamental rate, reverse fundamental rate, service option, forward traffic type, reverse traffic type, fundamental frame size, forward fundamental RC, reverse fundamental RC, IP technology, compulsory tunnel indicator, and release indicator. The forward Mux option, reverse Mux option, forward fundamental rate, reverse fundamental rate, service option, forward traffic type, reverse traffic type, fundamental frame size, forward fundamental RC, reverse fundamental RC are defined in TIA/EIA-2000. IP technology is defined as Simple IP or Mobile IP as defined in TIA/EIA-835, also available from the Telecommunications Industry Association/Electronics Industry Association. The compulsory tunnel indicator and release indicator are also both defined in TIA/EIA-835.

The session activity indicators 860 include data octet count for when the mobile station is the termination point, data octet count for when the mobile station is an origination point, bad Point-to-Point Protocol (PPP) frame count, event time, active time, number of active transitions, SDB octet count for when the mobile station is the termination point, SDB octet count for when the mobile station is the origination point, number of SDB transmissions when the mobile station is the termination point, and number of SDB transmission when the mobile station is the origination point. Each of these parameters will be address individually below.

The data octet count for when the mobile station is the termination point provides a total number of data octets received by the mobile station. The data octet count for when the mobile station is the origination point is a total number of data octets sent by the mobile station.

The bad PPP frame count is the total number of bad PPP frames encountered. Point-to-Point Protocol (PPP) is a data link protocol that provides dial-up access over serial lines. A frame is a fixed block of data transmitted as a single entity. A frame is also sometimes referred to as a data packet. Thus, the bad PPP frame count provides a total number of bad packets received over a dial-up access link.

The event time indicates the start of an accounting session or stop of an accounting session if part of a start airlink record or stop airlink record. In an interim record, the event time indicates the time of the event that triggered the interim message.

The active time indicates the total active connection time on the traffic channel(s) in seconds. The number of active transitions is the total number of non-active to active transitions. The SDB octet count is the total number of octets sent or received via short data bursts. The number of short data bursts is the total number of short data burst transactions in which data was either sent or received.

The special billing instructions identifier 870 identifies an alternate entity for which data session usage may be billed. For example, the special billing instructions identifier 870 may designate a credit card number, telephone number account, Internet Service Provider (ISP) account, or the like, to which session usage may be billed.

The quality of service identifiers 880 include an IP quality of service (QoS), an interconnection IP network provider identifier, an interconnecting IP network service QoS, and an airlink QoS. The IP QoS identifies the level of transmission quality at the IP layer. The IP QoS specifically refers to Diff-Serv codepoints as defined by the IETF. The interconnection IP network provider identifier identifies the IP network which connects the wireless communication network with the destination of the communication. The interconnecting EP network service QoS identifies the QoS offered by the IP network which connects the wireless communication network with the destination of the communication. The airlink QoS identifies level of transmission quality over the air as defined by TIA/EIA-2000.

There are a number of accounting triggers that are received by the accounting controller. These triggers include, but are not limited to, the establishment or teardown of a wireless network/data network connection, the arrival of forward or reverse direction user data, the reception of active start and active stop records, the reception of a short data burst airlink record, and the expiration of an interim timer.

As mentioned above, data may be sent over an active traffic channel or through the use of short data bursts. A start and stop airlink record may be sent for each non-active to active transition and also for each short data burst. However, this may lead to a race condition as illustrated by the following example.

Assume the mobile station is at first in a dormant state. Thereafter, data network originated data flows into the bridge server and is forwarded to the wireless communication network. The wireless communication network starts to transmit the data as a short data burst. As the short data burst is transmitted, more data arrives in the data network and is sent to the wireless communication network. The wireless communication network completes the short data burst and sends an indication to the data network of the completion of the short data burst. The data network sends start and stop airlink records with the total octet counts of both short data bursts. The wireless communication network transmits the second short data burst and sends an indication to the data network that the short data burst has completed. The data network needs to send another set of start and stop airlink records, however the octet counts have been zeroed out due to the previous start and stop airlink records having been sent.

In addition, the number of accounting messages sent to the accounting server is greatly increased with increased usage of short data bursts. This is because each short data burst generates a start and stop airlink record. Since many short data bursts must be used to send the same amount of data as a typical active traffic channel transmission, the short data bursts generate a much larger number of accounting records than an equivalent active traffic channel transmission.

In a preferred embodiment of the present invention, the above problems are addressed by accumulating accounting information over a series of short data bursts and a series of active traffic channel transmissions. In this way, the number of airlink records generated is reduced and the race conditions are eliminated. The preferred embodiment will now be described with reference to the following timing diagrams.

Figure 9:
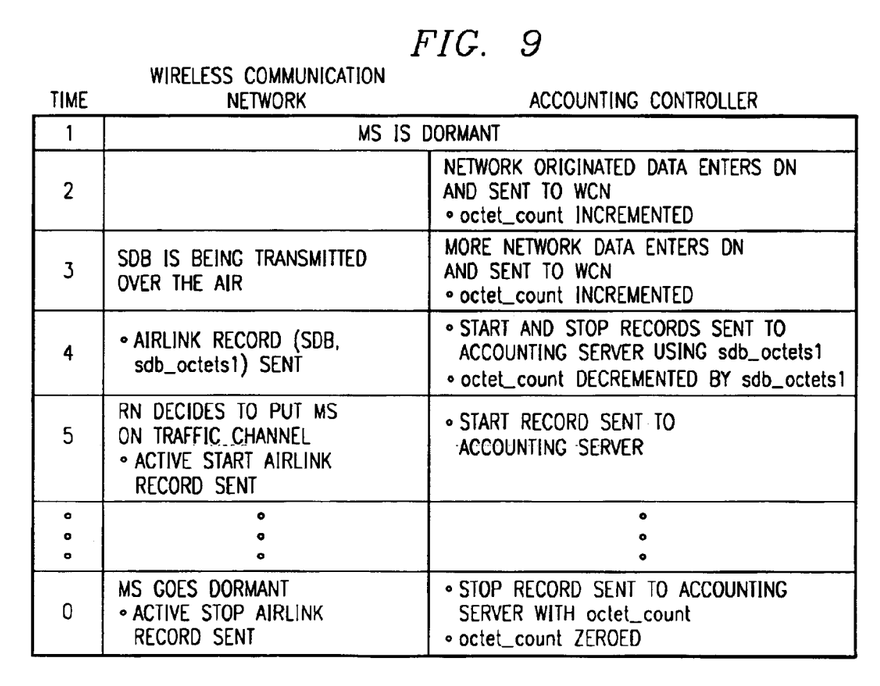
FIG. 9 is an exemplary timing diagram illustrating the messages sent when a start and stop record are sent for each SDB to the accounting server.

FIG. 9 is an exemplary timing diagram of the present invention when generating a start/stop airlink record for each short data burst. For purposes of illustration, only data flowing from the data network to the mobile station will be described in detail. However, those of ordinary skill in the art will appreciate the advantages of the present invention in either a sending or receiving mode.

As shown in FIG. 9, the operation starts with the mobile station (MS) being dormant (T1). At some time later, data enters the data network and is sent to the wireless communication network via the bridge server. The accounting controller increments the received octet count by the number of octets received (T2). The data is transmitted as a short data burst in the wireless communication network. At the same time, more data enters the data network and is sent to the wireless communication network. The octet counts for the number of octets received, number of octets sent, number of octets sent in short data burst, and the like, are incremented in the accounting controller (T3). Start and stop airlink records are sent to the accounting server identifying the number of octets sent. The number of octets in the accounting controller are then decremented by the number of octets identified in the start and stop airlink records (T4).

It is assumed, in this example, that the number of octets received while the short data burst is being sent is above a predetermined threshold. Once this threshold is exceeded, the WCS determines that the data should be sent over an active traffic channel. As a result, an active start airlink record is sent to the accounting controller (T5). At some time thereafter, the active traffic channel goes dormant and an active stop airlink record is sent to the accounting controller (T6).

FIG. 10 illustrates a preferred embodiment of the present invention in which short data bursts (SDBs) are accumulated over an interval. As shown in FIG. 10, the mobile station (MS) is initially dormant (T1). Thereafter, data is received by the data network and sent to the wireless communication network. The total number of octets received is then incremented in the accounting controller (T2). The data received is sent to the mobile station as a first short data burst. While the first short data burst is being sent, more data is received by the data network and sent to the wireless communication network. The total number of octets received is incremented in the accounting controller by the amount of the received data (T3).

A second SDB is transmitted to the MS. An airlink record identifying the transmission of the first SDB is sent by the wireless communication network to the accounting controller. The accounting controller increments the number of SDBs by 1 and the total number of SDB octets by the number of octets in the first SDB. Meanwhile, more data is being received by the data network and sent to the wireless communication network. The total number of octets received is then incremented by the number octets in the second set of received data (T4).

The third set of data is transmitted as a third SDB to the MS. An airlink record identifying the transmission of the second SDB is sent by the wireless communication network to the accounting controller. The accounting controller increments the number of SDBs by 1 and the total number of SDB octets by the number of octets in the second SDB. Meanwhile, more data is being received by the data network and sent to the wireless communication network. The total number of octets received is then incremented by the number of octets in the third set of received data (T5).

An interim timer expires (T6). This is a configurable timer the operator sets to make sure accounting data does not "sit too long" in the bridge server 150 without being sent to the accounting server 160. This avoids the case where the bridge server 150 goes down and all unsent accounting data would be lost. With the present invention after a certain interval, the interim timer fires to make sure a snapshot of the accounting data is sent to the accounting server 160.

The wireless communication network sends an airlink record identifying the transmission of the third SDB. The accounting controller increments the number of SDBs by 1 and the total number of SDB octets by the number of octets in the third SDB. Meanwhile, more data is being received by the data network and sent to the wireless communication network. The total number of octets received is then incremented by the number of octets in the fourth set of received data (T7).

Because the fourth set of received data meets a predetermined criteria, it is assumed that the wireless communication network activates the traffic channel for transmission to the mobile station. As a result, an active start airlink record is sent to the accounting controller. Meanwhile more data is being received in the data network for transmission to the mobile station. A start record is sent to the accounting server identifying the number of SDBs, total number of SDB octets and the octet count. The octet count is then incremented by the number of octets received (T8).

Transmission of data to the mobile station is then over an active traffic channel until the mobile station goes dormant. At this time, an active stop airlink record is sent from the wireless communication network to the accounting controller. The accounting controller sends a stop record to the accounting server identifying the number of SDBs, total number of SDB octets and the octet count. This information is sent again since the stop record must be cummulative and contain all the information since the start record. In other words, the start record opens an accounting entry and the stop record reports all the final counts. The total number of SDBs, SDB octets and the octet count are then cleared (Tn).

Thus, with the present invention, the number of messages sent to the accounting server is minimized by accumulating short data burst information over an interval containing a plurality of short data bursts. Thus, rather than sending eight accounting messages to the accounting server in the above example, only four messages are sent, thereby reducing the number of required accounting messages to half. In addition, the race condition that may be encountered when sending accounting messages for each short data burst are eliminated due to the accumulation of short data burst information over a time interval. The time interval in this example is the period starting with the first short data burst and ending when data transmission over an active traffic channel is started.

As mentioned above, the accumulation of accounting information is not limited to short data burst information. Rather, benefits may be obtained from accumulating accounting information over an interval of active traffic channel transmissions. The following timing diagrams will illustrate the use of accumulation when applied to active traffic channel transmissions.

Figure 11:
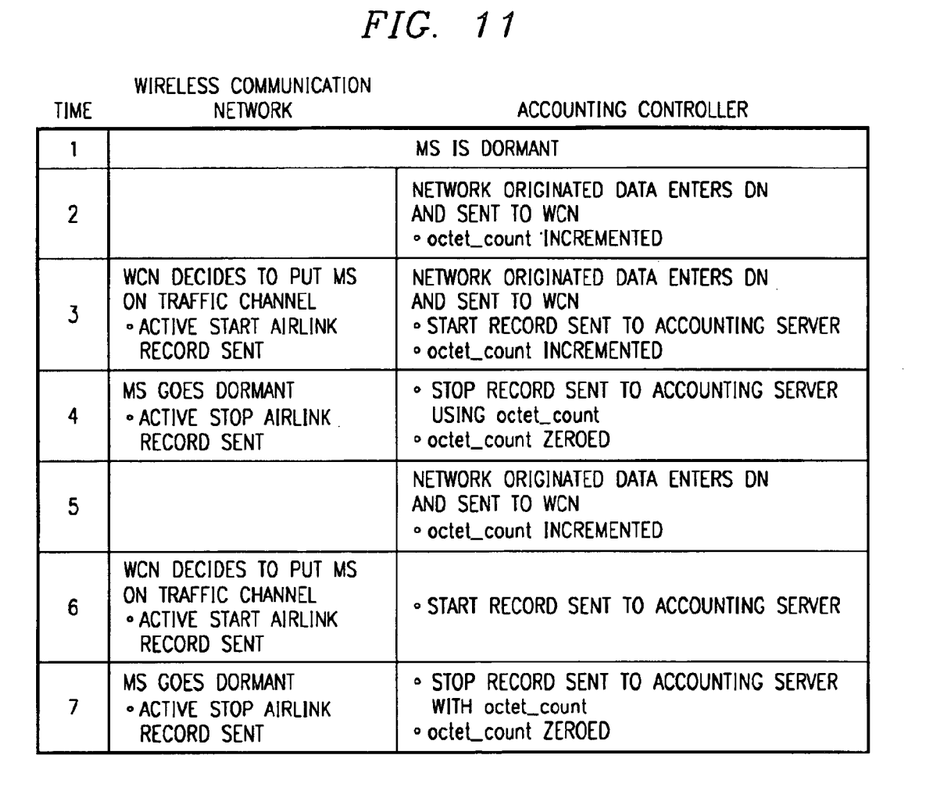
FIG. 11 is an exemplary timing diagram illustrating the messages sent when a start and stop record are sent for each active transmission.

FIG. 11 is an exemplary timing diagram of the present invention when sending accounting messages for each active traffic channel transmission. As shown in FIG. 11, the mobile station is initially in a dormant state (T1). Thereafter, data is received in the data network and sent to the wireless communication network via the bridge server. The accounting controller in the bridge server increments the octet count by the number of octets received (T2).

Because the data received meets a predetermined criteria, the wireless communication network is assumed to initiate an active traffic channel and an active start airlink record is sent to the accounting controller. The accounting controller then sends a start record to the accounting server. Meanwhile, more data is received by the data network for transmission to the wireless communication network. The octet count is incremented by the amount of this additional data (T3).

At some time later, the mobile station goes dormant and an active stop airlink record is sent to the accounting controller. The accounting controller sends a stop record to the accounting server identifying the number of octets. The octet count is zeroed by the accounting controller (T4).

Thereafter, more data is received by the data network for transmission to the wireless communication network. The accounting controller increments the octet count by the amount of data received (T5). Because the data satisfies a predetermined criteria, the wireless communication network opens an active traffic channel to the mobile station for transmission of the data. As a result, an active start airlink message is sent to the accounting controller. The accounting controller sends a start record to the accounting server (T6).

At some time later, the mobile station goes dormant and an active stop airlink message is sent to the accounting controller. The accounting controller sends a stop record to the accounting server with the octet count and zeroes the octet count (T7). Thus, when sending start and stop messages to the accounting server for each active traffic channel transmission, the number of messages sent in the above example is four.

Figure 12:
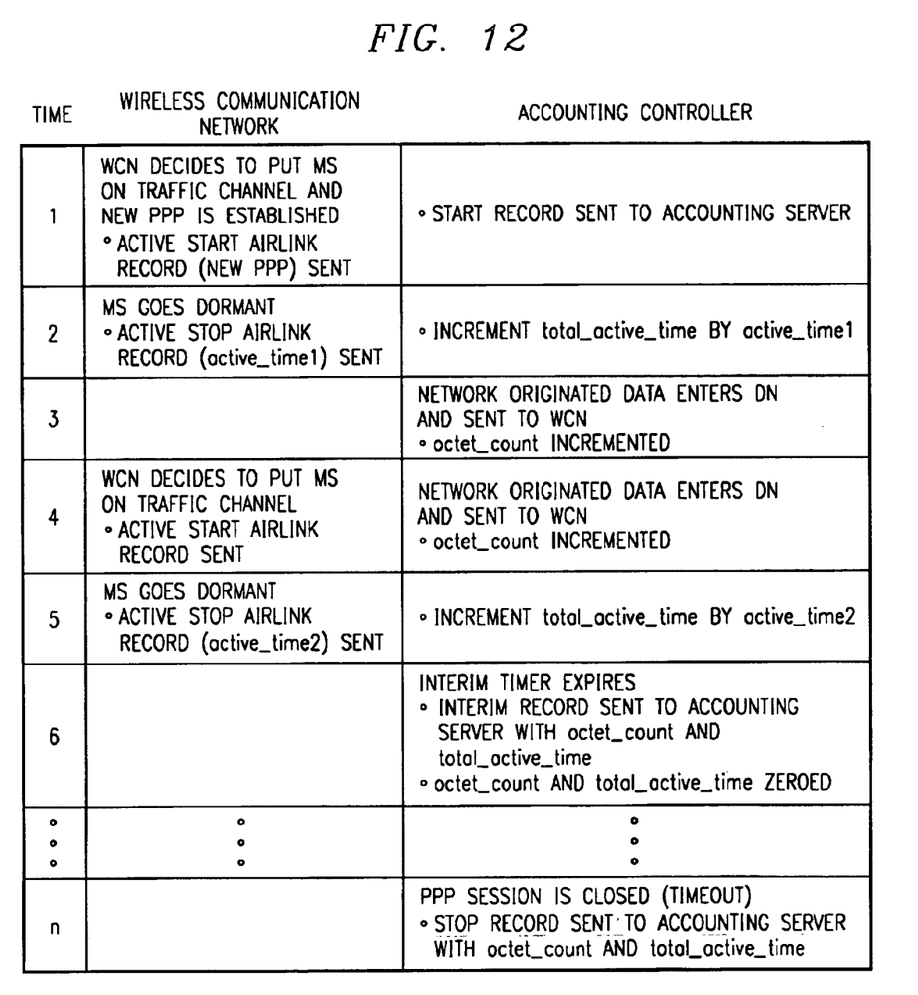
FIG. 12 is an exemplary timing diagram illustrating the messages sent when active transmission accounting information is accumulated for a plurality of active transmissions.

FIG. 12 shows an example of a preferred embodiment of the present invention when accumulating active traffic channel accounting information over a plurality of active traffic channel transmissions. As shown in FIG. 12, when a PPP session is initiated and the wireless communication network opens an active traffic channel to the mobile station for transmitting data from the data network, an active start airlink record is sent to the accounting controller. The accounting controller then sends a start record to the accounting server (T1).

At some time later, the mobile station goes dormant and an active stop airlink record is sent to the accounting controller identifying the time the active traffic channel was utilized. The accounting controller increments a total active time by the amount of the active time received from the wireless communication network (T2).

Thereafter, more data is received by the data network for transmission to the wireless communication network. The octet count is incremented by the accounting controller (T3). The wireless communication network opens an active traffic channel for transmitting the data and sends an active start airlink record to the accounting controller. Meanwhile, more data is received by the data network for sending to the wireless communication network. The accounting controller increments the octet count by the amount of data received (T4).

Some time later, the mobile station goes dormant and an active stop airlink record is sent to the accounting controller identifying the amount of time the active traffic channel was utilized. The accounting controller increments the total active time by the time the active traffic channel was utilized (T5).

When an interim timer expires, an interim record is sent to the accounting server with the octet count and the total amount of time active. The accounting controller then zeroes out the octet count and the total amount of time active (T6).

Then, at some time (Tn), the PPP session is closed and a stop record is sent with the octet count and total active time to the accounting server. Thus, with the preferred embodiment of the present invention, only three accounting messages are sent to the accounting server rather than six, as would be required by the first embodiment of the present invention as shown in FIG. 11. Thus, the preferred embodiment of the present invention reduces the number of accounting messages to half.

When a wireless communication network/data network connection is established, a session identifier is generated to identify this connection. One session identifier may be used with multiple IP addresses in the data network. Thus, a different UDR is created for each IP address. On the arrival of any airlink record, the accounting controller matches the airlink record with the UDR(s) based on the session identifier and the IP address.

With reference back to FIG. 8, when the wireless communication network/data network connection is established, information is sent to the accounting controller that allows the following fields in the new UDR to be filled: A1, A2, A3, A4, C1, D3 and D4. After IP service has been established for a mobile station, the following UDR fields are filled by the accounting controller: B1, B2, D1, D2, F2, F3, H1, I1, I2 and I3. The remainder of the UDR is considered blank.

When a wireless communication network/data network connection is torn down, the UDR fields G6 and G7 are set based on the system date and time and a stop record is sent to the accounting server based on the UDR. The UDR is then deleted.

When user data is received by the bridge server in a forward direction, the accounting controller increments G1 by the number of octets of data received. When user data is received by the bridge server in a reverse direction, the accounting controller increments G2 by the number of octets of data received.

When an active start airlink record is received by the accounting controller, if the UDR is a new UDR (partially blank), the following fields of the UDR are set based on the corresponding fields (e1, f1, g4, g5 and i4) in the active start airlink record: E1, F1, G4, G5 and I4. If the UDR is not a new UDR and the airlink start record indicates that parameters in the UDR have changed, a stop record is sent to the accounting server based on the current UDR, the UDR fields are set according to their corresponding fields in the airlink start record, and the fields G1–G12 are zeroed. A start record is then sent to the accounting server based on the UDR as modified by the airlink start record.

If an SDB airlink record is received, and the field f4 in the SDB airlink record indicates that the mobile station terminated the transmission, the field G9 is incremented by the value of the corresponding field (g9) in the SDB airlink record. The field G11 is incremented by 1. If the SDB airlink record indicates that the mobile station originated the transmission, the field G10 is incremented by the value of the corresponding field (g9) in the SDB airlink record and G12 is incremented by 1.

If an airlink stop record is received, the accounting controller increments field G8 by the value of the corresponding field (g8) in the airlink stop record.

Figure 13:
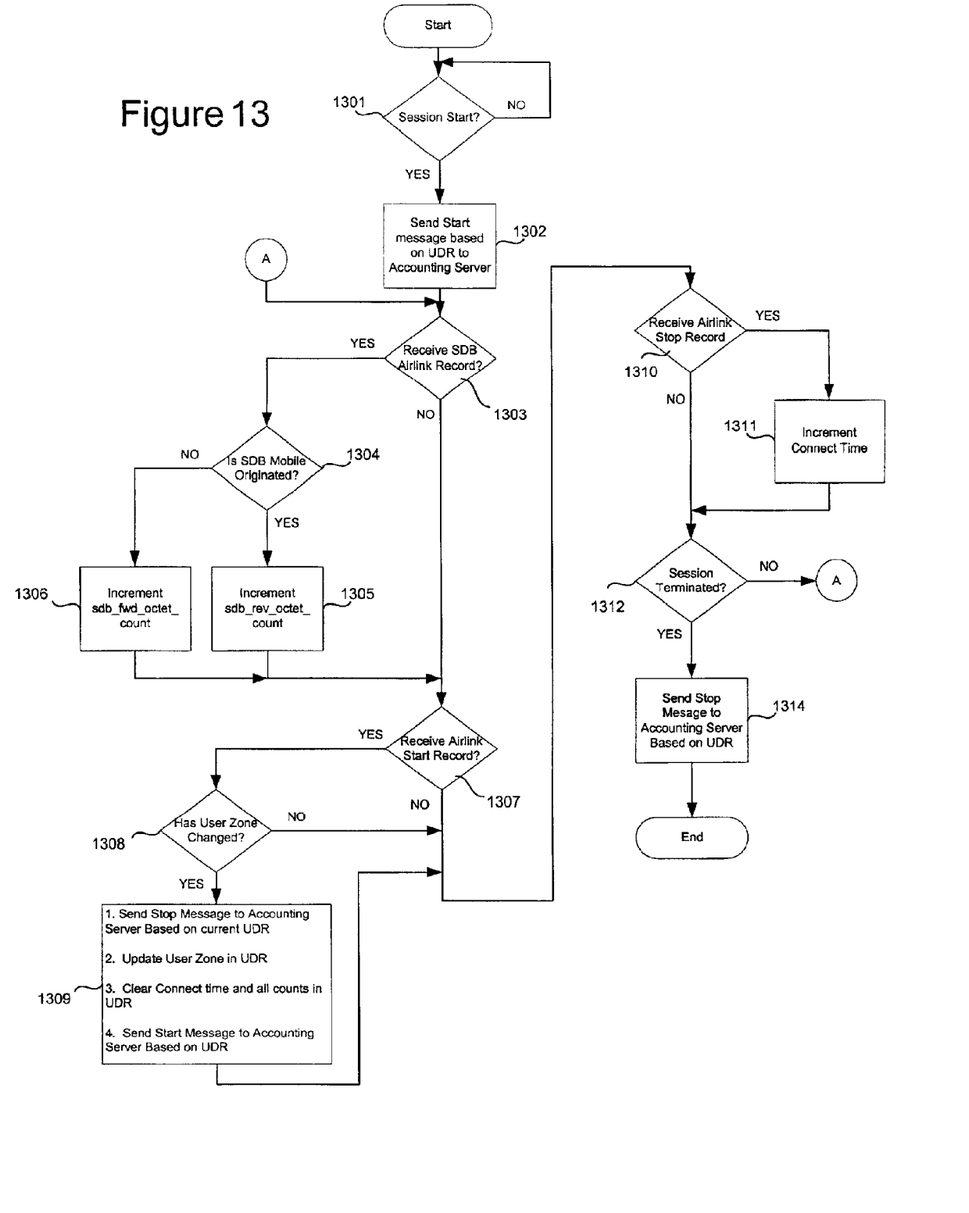
FIG. 13 is a flowchart outlining an exemplary operation of the present invention.

FIG. 13 is a flowchart outlining an exemplary operation of the present invention. As shown in FIG. 13, the operation starts with a determination as to whether or not a session has been started (step 1301). If not, the operation continues to monitor for a start of a session. If a session has been started, a start message is sent to the accounting server based on the UDR (step 1302).

A determination is then made as to whether an SDB airlink record has been received (step 1303). If an SDB airlink record has been received, a determination is made as to whether the SDB airlink record was received from an originating mobile station or a terminating mobile station (step 1304). If the SDB airlink record is from an originating mobile station, the SDB forward octet count is incremented by the amount of the octets in the SDB airlink record (step 1305). If the SDB airlink record is from a terminating mobile station, the SDB reverse octet count is incremented by the amount of the octets in the SDB airlink record (step 1306). Thereafter, or if an SDB airlink record is not received, the operation continues to step 1307.

A determination is made as to whether an airlink start record has been received (step 1307). If an airlink start record has been received, a determination is made as to whether the user zone has changed (step 1308). If the user zone has changed, a stop message is sent to the accounting server based on the current UDR, the user zone is updated in the UDR, the connect time and all counts in the UDR are cleared, and a start message is sent to the accounting server based on the new UDR (step 1309). Thereafter, or if the user zone has not changed or if an airlink start record has not been received, the operation continues to step 1310.

A determination is made as to whether an airlink stop record has been received (step 1310). If an airlink stop record has been received, a connect time is incremented (step 1311). Thereafter, or if an airlink stop record has not been received, a determination is made as to whether the session has been terminated (step 1312). If the session has not been terminated, the operation returns to step 1303. If the session has been terminated, a stop message is sent to the accounting server based on the UDR (step 1314) and the operation ends.

With the present invention, the number of accounting messages sent to an accounting server is greatly reduced. This results in less traffic over the network, less computing time required by the accounting server and a lower risk of creating race conditions.

It is important to note that, while the present invention has been described in the context of a fully functioning data processing system, those of ordinary skill in the art will appreciate that the processes of the present invention are capable of being distributed in the form of a computer readable medium of instructions and a variety of forms, and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description but is not intended to be exhaustive or limited to the invention in the form disclosed. Many modifications and variations will be apparent to those of ordinary skill in the art. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method to optimize accounting records in a wireless/packet data network, comprising the steps of:

detecting that a communication link has been established between a mobile terminal and a host in a packet data network; and accumulating, at a packet data serving node disposed between the mobile terminal and the packet data network, accounting information relating to a wireless communication network serving the mobile terminal and the packet data network, the accounting information being used by service providers to generate billing data to minimize the frequency of producing accounting records by the packet data serving node;

wherein only one start record and only one stop record are sent to an accounting server for a plurality of short data burst transmissions.

2. The method of claim 1, wherein the accounting information includes first accounting information obtained from one or more base station controllers in the wireless communication network and second accounting information maintained by the packet data serving node for the packet data network.

3. The method of claim 2, further comprising:

merging the first accounting information and the second accounting information into a usage data record (UDR).

4. The method of claim 1, further comprising:

sending an accounting information to an accounting server based on the occurrence of a predetermined event.

5. The method of claim 4, wherein the accounting server is a Remote Authentication Dial-In User Service (RADIUS) server.

6. The method of claim 4, wherein the predetermined event is receipt of a session release airlink record from the wireless communication network.

7. The method of claim 4, wherein the predetermined event is receipt of an active stop airlink record.

8. The method of claim 4, wherein the predetermined event is receipt of a short data burst stop airlink record.

9. The method of claim 4, wherein the predetermined event is an expiration of an interim timer.

10. The method of claim 1, wherein accounting information relating to a wireless communication network is obtained from accounting message sent from the wireless communication network.

11. The method of claim 10, wherein the accounting messages sent from the wireless communication network include one or more of a connection setup airlink record, a connection release airlink record, an active start airlink record, an active stop airlink record, and a short data burst airlink record.

12. The method of claim 1, wherein the accounting information is accumulated over a series of short data bursts.

13. The method of claim 1, wherein the accounting information is accumulated over a series of active traffic channel transmissions.

14. The method of claim 1, wherein the accounting information includes the number of octets of data received from a mobile terminal and a number of octets sent to the mobile terminal.

15. The method of claim 14, wherein the number of octets of data received from the mobile terminal and the number of octets sent to the mobile terminal further includes the number of octets received from the mobile terminal in the form of short data bursts and the number of octets sent to the mobile terminal in the form of short data bursts.

16. The method of claim 1, wherein the accounting information includes a plurality of short data bursts.

17. The method of claim 1, further comprising:

generating a session identifier, wherein the accounting information is accumulated based on a session identifier.

18. The method of claim 1, wherein the accounting information is associated with a session having multiple IP addresses and wherein accounting information for the wireless communication network and the packet data network are accumulated based on a session identifier and an IP address from multiple IP addresses.

19. The method of claim 1, wherein the stop record sent to the accounting server includes a number of short data bursts, a total number of short data burst octets, and an octet count for the plurality of short data burst transmissions.

20. The method of claim 1, wherein the start record is a start airlink record, and wherein the stop record is a stop airlink record.

* * * * *

UNITED STATES PATENT AND TRADEMARK OFFICE
CERTIFICATE OF CORRECTION

PATENT NO. : 6,853,630 B1
DATED : February 8, 2005
INVENTOR(S) : Manning

It is certified that error appears in the above-identified patent and that said Letters Patent is hereby corrected as shown below:

Column 2,
Line 16, after "FIGS." delete "5A and 8B" and insert -- 8A and 8B --.

Column 15,
Line 37, after "accounting" delete "message" and insert -- messages --.

Signed and Sealed this

Third Day of January, 2006

JON W. DUDAS
*Director of the United States Patent and Trademark Office*